US010241696B1

(12) United States Patent
Kowalyshyn

(10) Patent No.: US 10,241,696 B1
(45) Date of Patent: Mar. 26, 2019

(54) SECURELY LAUNCHING FILES DOWNLOADED TO POTENTIALLY UNSAFE LOCATIONS ON A COMPUTER SYSTEM

(71) Applicant: Symantec Corporation, Mountain View, CA (US)

(72) Inventor: Daniel J. Kowalyshyn, Yorba Linda, CA (US)

(73) Assignee: Symantec Corporation, Mountain View, CA (US)

( * ) Notice: Subject to any disclaimer, the term of this patent is extended or adjusted under 35 U.S.C. 154(b) by 134 days.

(21) Appl. No.: 15/433,431

(22) Filed: Feb. 15, 2017

(51) Int. Cl.
*G06F 3/06* (2006.01)

(52) U.S. Cl.
CPC .......... *G06F 3/0619* (2013.01); *G06F 3/065* (2013.01); *G06F 3/067* (2013.01)

(58) Field of Classification Search
CPC ....... G06F 3/0619; G06F 3/067; G06F 3/0635
See application file for complete search history.

(56) References Cited

U.S. PATENT DOCUMENTS

| 2006/0265740 | A1* | 11/2006 | Clark | G06F 21/34 |
| | | | | 726/8 |
| 2008/0276100 | A1* | 11/2008 | Varone | G06F 21/123 |
| | | | | 713/190 |
| 2015/0121487 | A1* | 4/2015 | Chastain | H04L 63/0869 |
| | | | | 726/6 |

OTHER PUBLICATIONS

Marc Silbey, et al., "Understanding and Working in Protected Mode Internet Explorer," <https://msdn.microsoft.com/en-us/library/bb250462(v=vs.85).aspx>, updated Feb. 2011, 17 pages.
Microsoft2Security Advisory 2269637, "Insecure Library Loading Could Allow Remote Code Execution," Published: Aug. 23, 2010/ Updated: May 13, 2014, <https://technet.microsoft.com/library/security/2269637>, 11 pages.
Dynamic-Link Library Security, https://msdn.microsoft.com/en-us/library/ff919712(d=printer), 3 pages.
Metasploit: Exploiting DLL Hijacking Flaws, Aug. 24, 2010, <http://blogs.msmvps.com/bradley/2010/08/24/-netasploit-exploiting-dll-hijacking-flaws/>, 8 pages.
Sanders, "Analyzing DLL Hijacking Attacks," TechGenix, Oct. 13, 2010, <http://www.windowsecurity.com/articles-tutorials/windows_os_security/Analyzing-DLL-Hijacking-Attacks.html>, 10 pages.

(Continued)

*Primary Examiner* — Hiep T Nguyen
(74) *Attorney, Agent, or Firm* — Patterson + Sheridan, LLP

(57) ABSTRACT

The present disclosure relates to protecting computer systems from installation of rogue shared libraries when executable files are launched. An example method generally includes detecting that a downloaded file has been written to an insecure location on the computing device. A computing device determines that the downloaded file includes at least a first executable component and, upon determining that the downloaded file includes executable components, generates a copy of the executable component in a protected repository on the computing device. The computing device overwrites the contents of the executable component with at least instructions to launch the copy of the downloaded file from the protected repository.

20 Claims, 5 Drawing Sheets

(56) References Cited

OTHER PUBLICATIONS

Phan, "A Crash Course in DLL Hijacking," Fortinet Blog, Dec. 10, 2015, <https://blog.fortinet.com/2015/12/10/a-crash-course-in-dll-hijacking>, 3 pages.

Amanda Stewart, "DLL-Side-Loading: A Thorn in the Side of the Anti-Virus(AV) Industry," RSA Conference 2014, https://www.rsaconference.com/writable/presentations/file_upload/hta-w04a-dll-side-loading-a-thom-in-the-side-of-the-anti-virus-_av_-industry.pdf, 15 pages.

* cited by examiner

US 10,241,696 B1

SECURELY LAUNCHING FILES DOWNLOADED TO POTENTIALLY UNSAFE LOCATIONS ON A COMPUTER SYSTEM

BACKGROUND

Field

Embodiments presented herein generally relate to computer security, and more specifically, to protecting computer systems from installation of rogue libraries when executing an executable file.

Description of the Related Art

Web browsers and other software programs generally allow users to download files, such as program installers, that a user can execute. Web browsers generally download files to a default location, such as a downloaded files folder in a user's profile folder (e.g., C:\Users\[username]\Downloads in Windows or ~/Downloads on Mac OS). The downloads folder generally allows a user to download and store a variety of files, including program installers, other executable files, shared libraries (e.g., Dynamic-Linked Libraries, or DLLs), and other content.

In some cases, installers may be configured to load shared libraries from the same directory that the installer is located. For example, if a user launches an installer from the downloaded files folder, the installer can search for shared libraries to load and install from the downloaded files folder before searching for the shared library in other locations (e.g., in a system folder or other repository on a local machine in which shared libraries are stored). Because programs download various types of files to the downloaded files folder by default, rogue or malicious shared libraries may be downloaded surreptitiously and stored in the same directory as an installer that searches for the shared library.

SUMMARY

One embodiment of the present disclosure includes a method for managing shared libraries loaded into memory when launching executable programs downloaded to an insecure location on a computing device. The method generally includes detecting that a downloaded file has been written to an insecure location on the computing device. A computing device determines that the downloaded file includes at least a first executable component and, upon determining that the downloaded file includes executable components, generates a copy of the executable component in a protected repository on the computing device. The computing device overwrites the contents of the executable component with at least instructions to launch the copy of the downloaded file from the protected repository.

Another embodiment provides a computer-readable storage medium having instructions, which, when executed on a processor, performs an operation for managing shared libraries loaded into memory when launching executable programs downloaded to an insecure location on a computing device. The operation generally includes detecting that a downloaded file has been written to an insecure location on the computing device. A computing device determines that the downloaded file includes at least a first executable component and, upon determining that the downloaded file includes executable components, generates a copy of the executable component in a protected repository on the computing device. The computing device overwrites the contents of the executable component with at least instructions to launch the copy of the downloaded file from the protected repository.

Still another embodiment of the present invention includes a processor and a memory storing a program, which, when executed on the processor, performs an operation for managing shared libraries loaded into memory when launching executable programs downloaded to an insecure location on a computing device. The operation generally includes detecting that a downloaded file has been written to an insecure location on the computing device. A computing device determines that the downloaded file includes at least a first executable component and, upon determining that the downloaded file includes executable components, generates a copy of the executable component in a protected repository on the computing device. The computing device overwrites the contents of the executable component with at least instructions to launch the copy of the downloaded file from the protected repository.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Executable files, such as portable executable files (.exe files) or program installers, generally link to one or more shared libraries (e.g., Dynamic-Linked Libraries, or DLLs) at execution time. Shared libraries provide functionality that the executables rely on to run. For example, shared libraries expose functions that a program can use to perform calculations using input gathered from a program, access hardware resources, access resources on remote computers, and so on. While many shared libraries are generally harmless, malicious shared libraries, such as those implementing keyloggers, packet capture mechanisms, spyware, or other malware exist and can be surreptitiously downloaded onto a user's computer (e.g., via drive-by downloads or inclusion in download packages along with known programs).

When a user launches an executable, instructions in the executable generally identify shared libraries that the executable is to load into memory. In some cases, an executable can be configured to search a local directory (e.g., the same directory that the executable file is located in) before searching other directories (e.g., a system folder or other repository in which shared libraries are stored) for shared libraries to load into memory. Thus, in such a case, when a user launches an executable file from a default downloaded files directory, shared libraries may be loaded into memory from the default shared files directory. However, because any program can download files into the default downloaded files directory, files in the downloaded files directory may not be trusted to be free of malware components. Thus, it is possible for malicious shared libraries to be loaded into memory for execution when a user launches an executable file from the default downloaded files directory.

Embodiments presented herein provide techniques for protecting computer systems from installation of rogue shared libraries when a user executes downloaded programs stored in an insecure location. According to some embodiments, computer systems can be protected from installation of rogue software libraries during program execution by launching executable files (e.g., programs or program installers) from a trusted, or secure, directory instead of the directory in which the file was downloaded (e.g., a default downloaded files folder or a user-specified folder). By launching executable files from a trusted or secure location instead of an insecure location, a system can prevent vulnerabilities from being introduced into a computer system through malicious shared libraries that may also be present in the insecure location.

Figure 1:
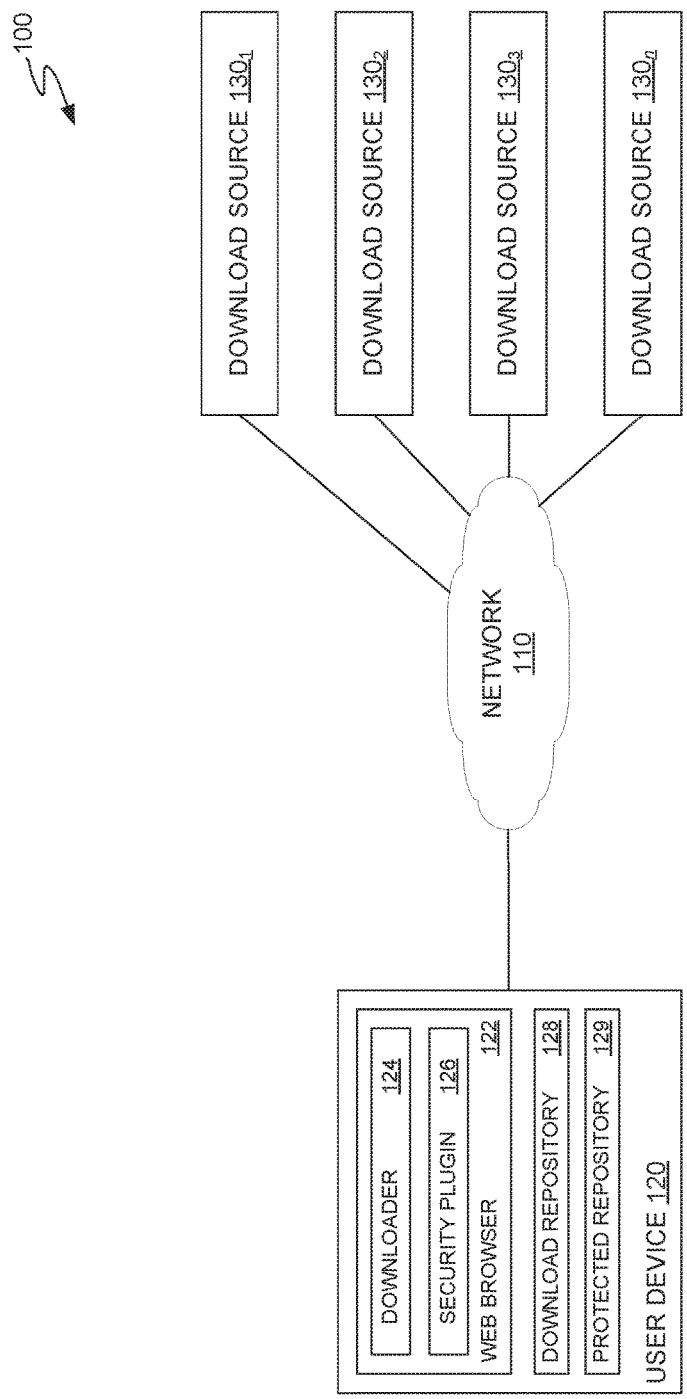
FIG. 1 illustrates an example of a networked computing environment, according to one embodiment.

FIG. 1 illustrates an example networked computing environment 100, according to an embodiment. As illustrated, computing environment 100 includes a user device 120 and a plurality of download sources 130.

As illustrated, user device 120 includes a web browser 122, a download repository 128, and a protected repository 129. Web browser 122 generally allows a user to communicate with remote systems (e.g., download sources 130) via the Internet.

Web browser 122 generally includes a downloader 124 and a security plugin 126. When a user begins a download through web browser 122 (e.g., by clicking on a link that points to a downloadable file on download source 130), web browser invokes downloader 124 to monitor the progress of the download and write the downloaded file to a storage device connected to user device 120. To write a downloaded file to a storage device, downloader 124 generally opens a file stream in a download repository 128 (e.g., the default downloaded files folder or a user-specified location) to write the download to a storage device connected to user device 120. As downloader 124 receives data from download source 130, downloader writes the received data to the file stream. When downloader 124 completes the download, downloader 124 generally closes the file stream, names the file, and makes the downloaded file available for use on user device 120.

Security plugin 126 generally monitors download repository 128 for downloaded files to determine whether to copy a file from download repository 128 to protected repository 129. In some cases, security plugin 126 begins analyzing files when security plugin 126 determines that a file stream opened by downloader 124 has been closed. If security plugin 126 determines that a downloaded file is not an executable file (e.g., is not a file that can potentially load malicious shared libraries into memory or install malicious shared libraries on user device 120), security plugin 126 can scan the file for malware. If the downloaded file contains malware, security plugin 126 can quarantine the file, delete the file, or attempt to remove the malware components of the file. Otherwise, the security plugin 126 need not take any further action with regards to the downloaded file.

If security plugin 126 determines that a downloaded file is an executable file (e.g., a Windows portable executable file (e.g., a .exe file), an installer, an executable (self-extracting) archive file, or other executable files), security plugin 126 can move the executable file to a protected folder (e.g., protected repository 129). As described in further detail below, the protected folder may be a hidden folder or a folder for which access controls allow a user of user device 120 to read from the folder but only allows write access to security plugin 126 (e.g., to store copies of executable files when downloader 124 finishes downloading an executable file).

In some cases, to protect user device 120 from an executable loading and installing rogue or malicious shared libraries, security plugin 126 can copy a downloaded folder to protected repository 129 and assign the copied folder a random name (e.g., a name based on a globally unique identifier (GUID) or universally unique identifier (UUID)). In some cases, to provide for additional security against malicious shared libraries, security plugin 126 can create a folder in protected repository 129 for each executable file downloaded by downloader 124. Security plugin 126 can assign, for example, a random name to each folder (e.g., using a globally unique identifier (GUID) or a universally unique identifier (UUID)). After security plugin 126 creates a folder in protected repository 129, security plugin 126 can copy the downloaded executable file to the newly created folder.

After security plugin 126 generates a copy of a downloaded executable file in protected repository 129 (e.g., by copying the executable file from download repository 128 to protected repository 129), security plugin 126 modifies the copy of the downloaded executable file in download repository 128. To allow a user to launch the downloaded executable file from download repository while preventing the executable file from loading and installing rogue or malicious shared libraries, security plugin 126 can overwrite the contents of the downloaded executable file in download repository with at least a link that launches the copy of the executable file stored in protected repository 129. When a user opens the downloaded file from download repository 128, the instructions in the file cause user device 120 to launch the copy of the executable file stored in protected repository 129. Because the executable file launches from protected repository 129 (in the root directory of protected repository 129 or a subdirectory of the protected repository), a shared library search process can search for shared libraries in protected repository 129 (e.g., a protected location in which shared libraries may not be stored) rather than in an insecure location (e.g., download repository 128 or a user-specified location on the file system of user device 120). As protected repository 129 may not store shared libraries, the executable can proceed to search other directories for shared libraries to load into memory (e.g., a system folder or other trusted locations in which shared libraries may be stored). In some cases, security plugin 126 may further modify an order in which directories are searched for shared libraries to load into memory. For example, security plugin 126 can enable a safe search mode, which may specify that a shared library search process search for shared libraries in protected repository 129 and system directories before searching for shared libraries in the current execution path or other insecure locations on the file system of user device 120.

In some cases, security plugin 126 can periodically scan download repository 128 for files that can be archived or purged. For example, security plugin 126 can examine a last-accessed date associated with the files stored in download repository 128 to identify files that can be purged (e.g., files that have not been accessed for more than a threshold amount of time). Security plugin 126 can, for example, copy the identified files to an archive folder in download repository 128 or delete the identified folders. If security plugin 126 deletes an executable file from download repository 128 (which, as discussed herein, may be an executable file that includes a link or reference to launch the executable from protected repository 129), security plugin 126 can also delete the folder in protected repository 129 associated with the executable file.

Download sources 130 generally are remote sources that a user can access, through network 110, to download various types of files, including executable files. Download sources 130 may be web servers, file transfer protocol (FTP) servers, peer-to-peer file sources, or other systems that host files for a user to download. When a user requests a file from a download source 130 (e.g., by clicking on a link that appears on a web page displayed in web browser 122), download source 130 receives a request for the identified file and begins transferring a copy of the file to user device 120. In some cases, download source 130 can provide the identified file to user device 120 using a protocol that ensures that packets arrive at user device 120 (e.g., using a Transmission Control Protocol-based transport mechanism).

Figure 2:
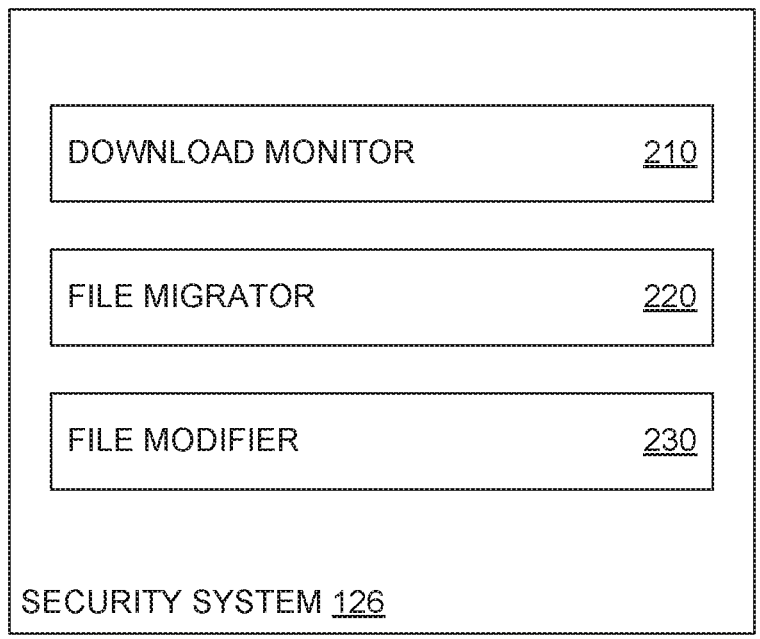
FIG. 2 illustrates an example security plugin, according to one embodiment.

FIG. 2 illustrates an example security plugin 126, according to some embodiments. As illustrated, security plugin 126 generally includes a download monitor 210, file migrator 220, and file modifier 230.

Download monitor 210 generally monitors file system activity generated by web browser 122 (e.g., downloader 124 of web browser 122) to identify when web browser 122 downloads files to user device 120. To identify when a user has downloaded a file onto user device 120, download monitor 210 can monitor for the creation of new file streams in download repository 128 and/or other locations in a file system of user device 120. When download monitor 210 determines that downloader 124 has closed a file stream, download monitor can determine that downloader 124 has completed downloading a requested file and can scan the file to determine whether to move the file to a protected location in the file system of user device 120 (e.g., to protected repository 129).

As discussed above, download monitor 210 can identify one or more actions to be performed on a downloaded file based on a type of the file. In some cases, download monitor 210 can determine a type of the file based on a media type (or MIME type) associated with the file, by scanning the file for information that identifies the type of the file, by examining a file extension, and so on. For example, if download monitor 210 determines that a file is not an executable file (e.g., a portable executable, a self-extracting archive file, an installer, or other executable file), download monitor can determine that the file need not be moved into protected repository 129. In some cases, download monitor 210 can invoke malware detection scans on downloaded files to determine if a file presents a security risk and take action to remove the security risk from user device 120.

If, however, download monitor 210 determines that a downloaded file is an executable file, download monitor 210 can determine that the download file should be moved from download repository 128 to protected repository 129. In some cases, to move the file to protected repository 129, download monitor 210 can request that file migrator 220 create a new folder in protected repository 129. In some cases, file migrator 220 can generate a unique identifier (e.g., a GUID or UUID) to use as the name of the folder. After creating the folder, file migrator 220 can copy the downloaded file from download repository 128 to the newly created folder in protected repository 129.

In some cases, to move a downloaded executable file to protected repository, file migrator 220 need not create a new folder within protected repository 129 for the downloaded executable file. File migrator 220 can copy the downloaded file to protected repository 129, and, in some cases, rename the executable file. In some cases, if file migrator 220 renames the copied version of the executable file, file migrator 220 can replace the name of the executable file with a unique identifier (e.g., a GUID or UUID).

File modifier 230 generally modifies the downloaded executable file in download repository 128 to launch an executable file from protected repository 129 instead of download repository 128. After file migrator 220 copies the downloaded executable file from download repository 128 to protected repository 129, file modifier 230 rewrites the contents of the downloaded executable file in download repository 128. In some cases, file modifier 230 can rewrite the downloaded executable file to cause the downloaded executable file to launch the copy of the executable file stored in protected repository 129. The rewritten executable may be, in some cases, a statically linked file that provides a link to the copied version of the executable. The rewritten executable may further set a shared library linking policy to specify the directories from which user device 120 can load shared libraries.

In some cases, file modifier 230 can modify the downloaded executable file to take further steps to launch the executable and minimize the risk of malicious shared libraries being loaded into memory. For example, the rewritten executable can change the current directory (current path), or the directory from which commands are launched, to a location in protected repository 129 (e.g., a folder that contains the actual executable file). In another example, instructions in the rewritten executable file can drop a process from an elevated process (e.g., a process for which a system administrator need not grant permission for the process to modify user device 120) to a restricted process for which a system administrator of user device 120 is prompted to manually allow or block the process from modifying user device 120. In yet another example, instructions in the rewritten executable file can examine the process against a blacklist of known malicious processes to determine if the process should be allowed to execute on user device 120.

In some cases, file modifier 230 can profile expected shared library characteristics to predict whether the copy of the executable will link to or load malicious shared libraries. To predict what shared libraries the copy of the executable will link to or load, file modifier 230 can examine characteristics such as the location and size of the shared libraries identified in an executable manifest, whether the identified shared libraries are signed and if so, by whom, and other information that the rewritten executable can use to predict if malicious shared libraries would be loaded into memory when the executable runs on user device 120. If file modifier 230 determines that launching the executable from the protected repository 129 is likely to load a malicious or potentially malicious shared library, file modifier 230 can attempt to remediate the predicted security risks that may arise from launching the executable.

In some cases, file modifier 230 can predict whether malicious shared libraries are likely to be loaded into memory during execution by comparing information about the shared libraries identified in an executable manifest to a known set of information about the shared libraries associated with a particular executable. If file modifier 230 identifies discrepancies between the known set of information and the information about the shared libraries identified in the executable manifest, file modifier 230 can determine that the executable is likely to cause malicious shared libraries to be loaded at runtime. File modifier 230 can, in some cases, attempt to remediate the executable by removing references to potentially malicious shared libraries or substituting potentially malicious shared libraries with shared libraries that are known to be authentic. In some cases, if file modifier 230 is unable to successfully modify the executable file to remediate potential security risks in the executable file, file modifier 230 can determine that the executable file is a security risk and delete the rewritten executable file from download repository 128 and the copy of the executable file from protected repository 129.

Figure 3:
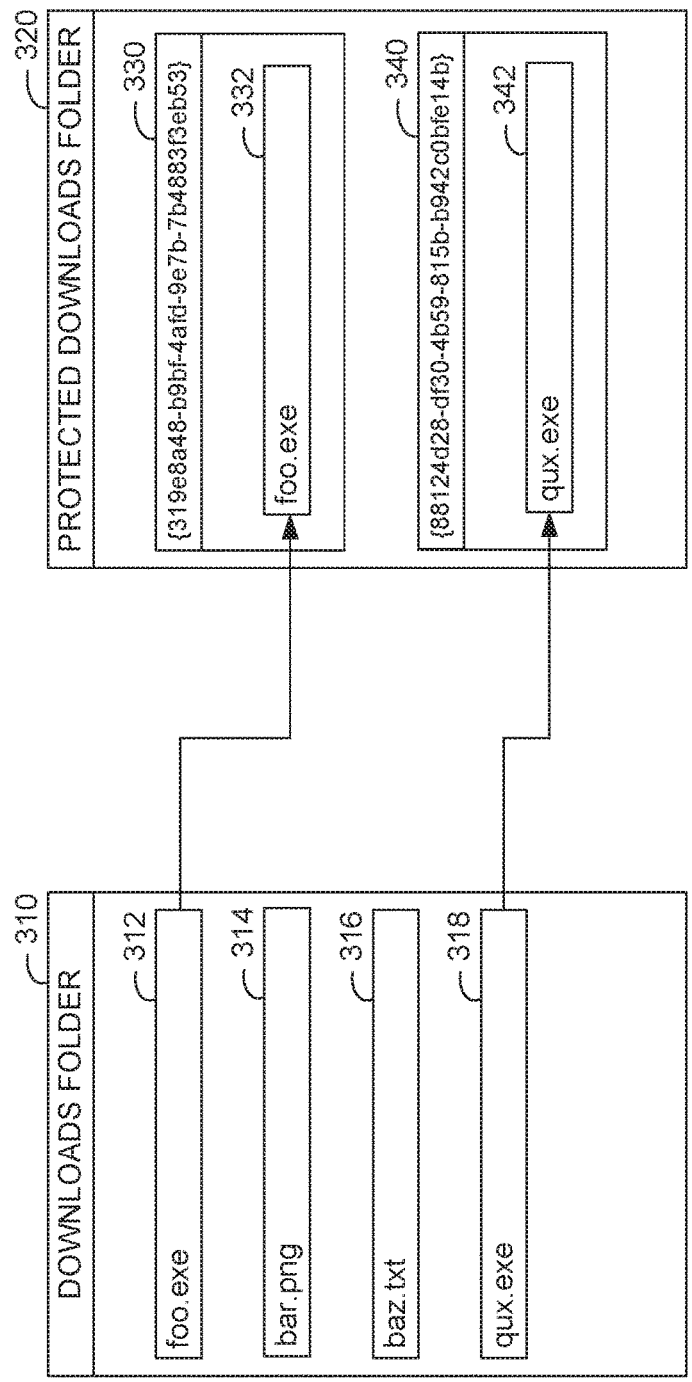
FIG. 3 illustrates example file system layout with executable files in a downloaded files folder replaced with links to executables stored in a secure downloads folder, according to one embodiment.

FIG. 3 illustrates example contents of a downloaded files folder and a protected downloads folder, according to an embodiment. As illustrated, downloaded files folder 310 includes a plurality of files that a user has downloaded from the Internet. For example, downloaded files folder 310 includes two executable files 312 and 318, named foo.exe and qux.exe, and two non-executable files 314 and 316, named bar.png (an image file) and baz.txt (a text file). As described above, when executable files 312 and 318 are downloaded into downloads folder, security plugin 126 can copy the files to protected downloads folder 320 and rewrite executable files 312 and 318 to include links to the executable files stored in protected downloads folder 320.

As illustrated, protected downloads folder 320 includes a uniquely named folder for each executable file downloaded into downloaded files folder 310. Folder 330, as illustrated, includes executable file 332, which may be the actual executable file that the user downloaded into downloaded files folder 310 (e.g., the actual copy of foo.exe). Similarly, folder 340 includes executable file 342, which may be the actual copy of qux.exe that the user downloaded into downloaded files folder 310.

As discussed above, when a user downloads executable files 312 and 318 into downloaded files folder 310, security plugin 126 can copy executable files 312 and 318 into protected downloads folder 320 as executable files 332 and 342, respectively. After copying the executable files into protected downloads folder 320 (or to subdirectories within protected downloads folder 320), security plugin 126 can rewrite executable files 312 and 318 to launch executable files 332 and 342, respectively, from the protected downloads folder 320 instead of from downloaded files folder 310. In some cases, security plugin 126 can further rewrite executable files 312 and 318 to take additional steps to minimize the risk of loading malicious shared libraries when executable files 332 and 342 are launched. For example, as discussed above, security plugin 126 can include instructions in executable files 312 and 318 to change the current folder to the protected downloads folder 320 or a subdirectory in the protected downloads folder 320 before launching executable files 332 and 342. In other cases, security plugin 126 can include instructions to cause executable files 332 and 342 to be launched from a restricted process instead of an elevated process to require a user to explicitly allow an executable file to modify system files (e.g., load and install shared libraries).

Figure 4:
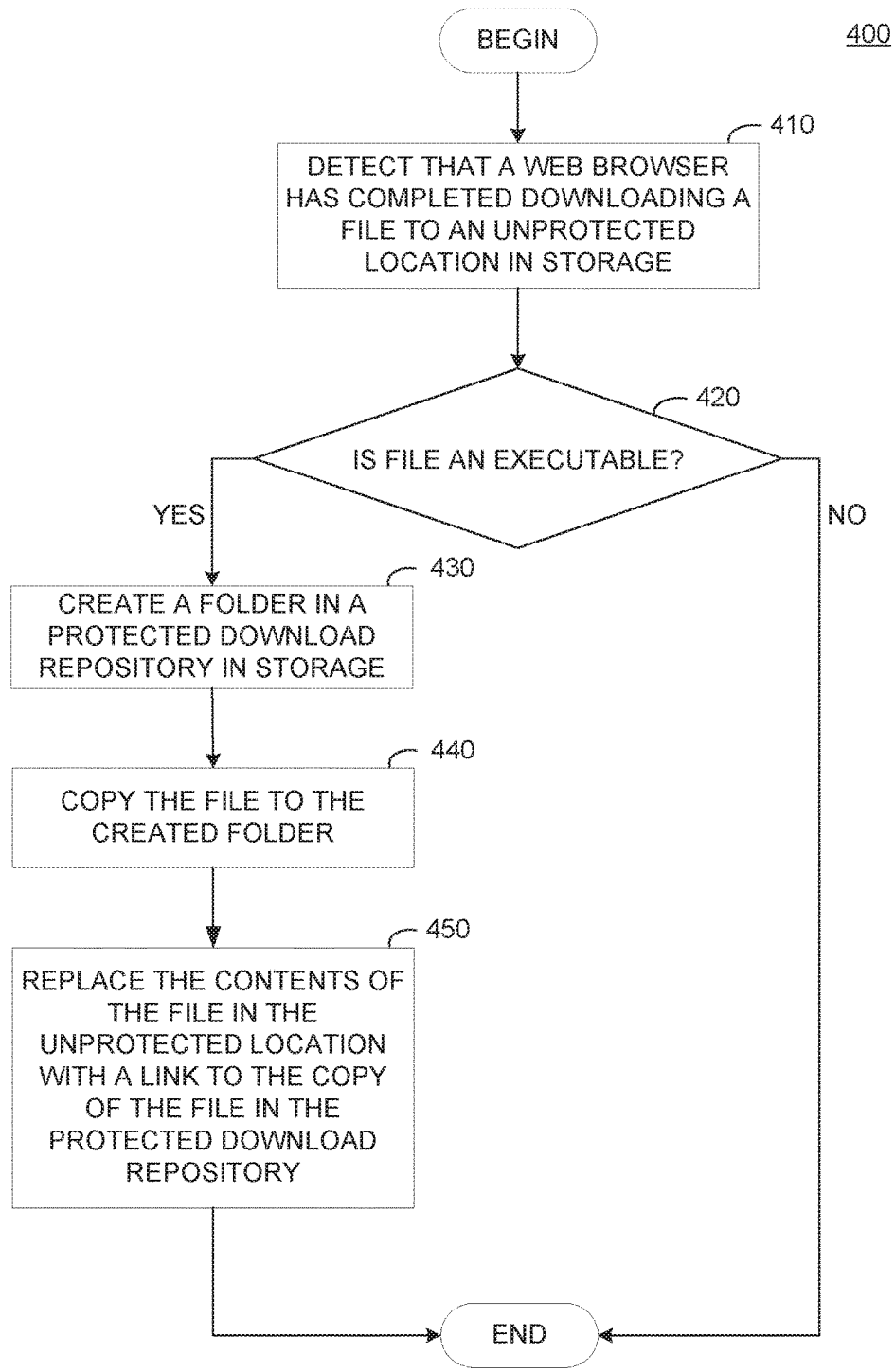
FIG. 4 illustrates example operations for replacing downloaded executable files in an insecure location with links to executable files stored in a secure location, according to one embodiment.

FIG. 4 illustrates example operations that may be performed by a security plugin 126 to rewrite downloaded executable files such that executable files launch in a protected repository instead of an unprotected repository, according to an embodiment. As illustrated, operations 400 begin at step 410, where security plugin 126 detects that a web browser has completed downloading a file to an unprotected location in storage. As discussed, security plugin 126 can detect that a web browser has completed downloading a file to an unprotected location in storage, such as downloads repository 128 (e.g., the default downloaded files folder) or a user-specified location in the file system of user device 120, by detecting that the web browser has closed a file stream. When the web browser closes a file stream, security plugin 126 can infer that a downloader component of the web browser has finished downloading a file and has written the file to a storage device connected to user device 120.

At step 420, security plugin 126 determines if the downloaded file is an executable file. If the download file is not an executable file (e.g., is a file other than a Windows portable executable file, a self-extracting archive file, an installer, or other executable file), operations 400 may terminate. In some cases, though not illustrated in FIG. 4, security plugin 126 can scan the downloaded file to determine if the downloaded file includes a malicious payload, and if so, attempt to remove the malicious payload from the downloaded file or delete the downloaded file from user device 120.

Otherwise, if security plugin 126 determines that the downloaded file is an executable file, at step 430, security plugin 126 creates a folder in a protected download repository in storage. As discussed, security plugin 126 can create a folder in protected repository 129 with the folder name set to a unique ID, such as GUID or UUID. Security plugin 126 may, in some cases, set folder access permissions for the created folder such that security plugin 126 can read from and write to the created folder. Folder access permissions for users of the user device 120 and other applications executing on user device 120 may be set, for example, to read-only mode to prevent programs other than security plugin 126 from storing potentially malicious libraries in the protected download repository.

At step 440, security plugin 126 copies the downloaded file to the created folder. After finishing copying the downloaded file, at step 450, security plugin 126 replaces the contents of the downloaded file in the unprotected location (e.g., downloads repository 128 or a different, user-specified location in the file system of user device 120) with a link to the copy of the file in the protected download repository. By rewriting the downloaded file to launch an executable in the protected download repository, security plugin 126 can prevent or minimize the likelihood that malicious shared libraries or other malware components will be loaded into memory and installed on user device 120 when a user launches a downloaded executable.

Figure 5:
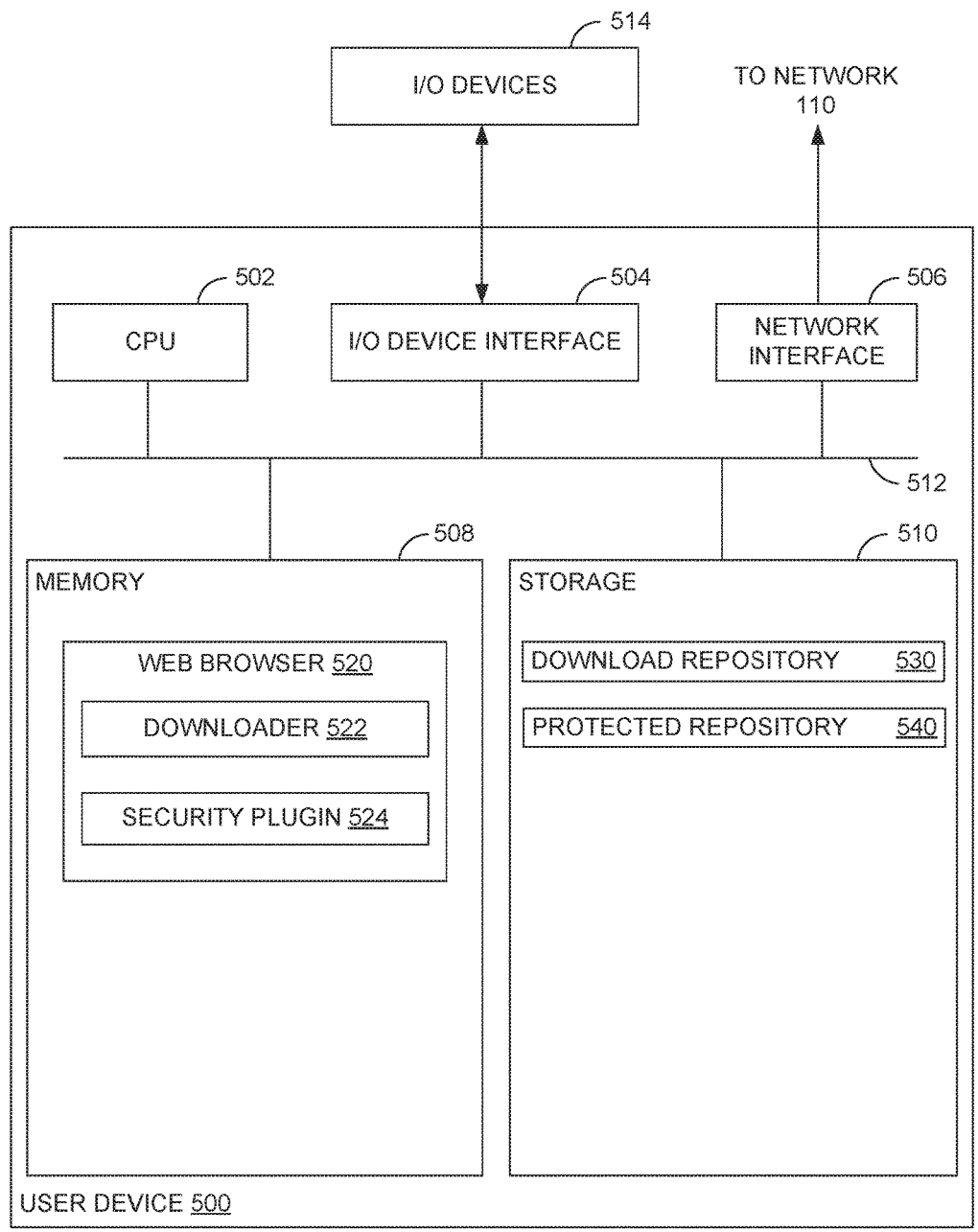
FIG. 5 illustrates an example computing system for securely launching files downloaded to insecure locations on a computer system, according to one embodiment.

FIG. 5 illustrates an example user device 500 that allows for the secure launching of downloaded files by replacing executable files in an insecure location with links to executable files stored in a secure location, according to an embodiment. As shown, the user device 500 includes, without limitation, a central processing unit (CPU) 502, one or more I/O device interfaces 504 which may allow for the connection of various I/O devices 514 (e.g., keyboards, displays, mouse devices, pen input, etc.) to the user device 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to user device 500, such as keyboards, mice, touchscreens, and so on. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a web browser 520. Web browser 520 generally includes a downloader 522 and a security plugin 524. Web browser 520 invokes downloader 522 when a user initiates a file download from a remote download source 130 (e.g., by clicking on a link to a file on a web page). In some cases, while downloader 522 is illustrated as a component within web browser 520, downloader 522 may also be a standalone program that allows a user to obtain data from remote download sources 130 (e.g., via file transfer protocol (FTP), peer-to-peer downloads, and so on). Generally, downloader 522 opens a file stream in download repository 530 of storage 510 when downloader 522 begins downloading a file from a remote download source 130, writes data to the file stream as downloader 522 receives data from remote download source 130, and closes the file stream when downloader 522 completes the download (e.g., receives data identifying the end of a file being transferred from download source 130 to user device 500).

Security plugin 524 generally monitors download repository 530 and other insecure locations in storage 510 for newly downloaded files. In some cases, security plugin 524 can monitor for newly opened filestreams on storage 510 created by downloader 522 and can determine that a download is complete when downloader 522 closes the filestream. When security plugin 524 determines that downloader 522 has completed downloading a file, security plugin 524 can first determine whether the downloaded file is an executable file. If the downloaded file is not an executable file (e.g., is not a Windows portable executable, a self-extracting archive, an installer, or other executable file), security plugin 524 need not take any further action to move the downloaded file from download repository 530 or another insecure location in storage 510 to protected repository 540.

Otherwise, security plugin 524 can create a folder in protected repository 540 and copy the downloaded file to the newly created folder in protected repository 540. After security plugin 524 copies the downloaded file to protected repository 540, security plugin 524 rewrites the copy of the downloaded file stored in download repository 530 to include instructions that launch the copy of the downloaded file from protected repository 540. In some cases, security plugin 524 may write additional instructions to the copy of the downloaded file stored in download repository 530 to reduce the risk of loading and installing malicious shared libraries or other malware on user device 500 when a user launches the executable file. For example, as discussed herein, security plugin 524 can write instructions to the executable file stored in download repository 530 to cause the corresponding executable file stored in protected repository 540 to launch from a restricted process instead of an elevated process, which may require that a user manually allow the executable to load and install files on user device 500. In some cases, security plugin 524 can include instructions in the rewritten copy of the downloaded file to, for example, change the current directory from which user device 500 executes commands to a directory in protected repository 540 and define a shared library loading policy that attempts to load shared libraries from "safer" directories, such as system directories that are known repositories that store shared libraries, before searching for shared libraries in the current directory.

In some cases, as discussed above, security plugin 524 can additionally attempt to predict the shared libraries that an executable file will load at runtime. For example, security plugin 524 can identify the shared libraries that the executable file is likely to load at runtime and examine information about the shared libraries (e.g., a location from which the executable loads the shared library, the size of the shared library, whether the shared library has been digitally signed, and if so, by whom, and so on). If security plugin 524 identifies libraries that are likely to be unsafe (e.g., unsigned libraries or libraries that have a different size and location than a known version of those libraries), security plugin 524 can attempt to remediate risks arising from the shared libraries. For example, security plugin 524 can attempt to rewrite a manifest that identifies libraries to load at runtime to reference known libraries that exist on user device 500 instead of an unknown or unsigned version of that library. In some cases, if security plugin 524 is unable to remediate potential risks arising from the shared libraries, security plugin 524 can determine that the downloaded executable file is a security risk and delete the downloaded executable file from download repository 530 and protected repository 540.

As shown, storage 510 includes a download repository 530 and a protected repository 540. Download repository 530 generally includes a designated default downloads folder (e.g., a downloads folder associated with a user profile) and/or other locations in which a user downloads files to. As discussed, download repository 530 may be unprotected, which allows a user of user device 500 and applications executing on user device 500 to read from, write to, and modify data stored in download repository 530. Because download repository 530 may be unprotected, malicious or potentially malicious shared libraries may be downloaded and stored in the same directory as executable files that reference those shared libraries.

Protected repository 540 may be a hidden or otherwise protected location in store 510 in which security plugin 524 stores downloaded executable files. In some cases, security plugin 524 may be allowed to read, write, and modify the data stored in protected repository 540. Meanwhile, users of user device 500 and other applications executing on user device 500 may receive read-only access to protected repository 540, which may allow a user to copy data from protected repository 540 but block the user from modifying files that already exist in protected repository 540 or storing new files in protected repository 540. As discussed, when a user launches an executable file from the rewritten executable file stored in download repository 530, the actual executable that runs on user device may be launched from protected repository 540. Because the executable actually launches from protected repository 540, the executable can load and/or install shared libraries from the protected repository 540 and/or known locations in which shared libraries are stored before searching for the shared libraries in other, insecure locations, which may reduce the risk of loading malicious shared libraries on user device 500.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for managing shared libraries loaded into memory when launching executable programs downloaded to an insecure location on a computing device, comprising:
   detecting that a downloaded file has been written to the insecure location on the computing device;
   determining that the downloaded file includes an executable component;
   generating a copy of the executable component to a protected repository on the computing device; and
   overwriting contents of the executable component in the downloaded file with at least instructions to launch the copy of the executable component from the protected repository.

2. The method of claim 1, wherein overwriting the contents of the executable component comprises writing, to the executable component, instructions for setting a current path to the protected repository, the current path identifying a location from which or more commands are executed.

3. The method of claim 1, wherein overwriting the contents of the executable component comprises writing, to the executable component, instructions for modifying an order in which the executable component searches the computing device for the shared libraries to load into the memory.

4. The method of claim 1, wherein generating the copy of the executable component to the protected repository comprises:
   creating a directory in the protected repository; and
   copying the downloaded file, including the executable component, from the insecure location to the directory in the protected repository.

5. The method of claim 1, wherein the protected repository comprises a hidden directory on the computing device and wherein permissions associated with the protected repository prevent users from writing data to the protected repository.

6. The method of claim 1, wherein the location on the computing device comprises a downloaded files folder associated with a user profile.

7. The method of claim 1, further comprising:
   identifying one or more files stored in the location that have not been accessed for a threshold amount of time; and
   deleting the identified files.

8. The method of claim 1, further comprising:
   deleting the downloaded file from the insecure location; and
   deleting, from the protected repository, the copy of the executable component referenced by the downloaded file.

9. A system, comprising:
   a processor; and
   a memory comprising instructions which, when executed by the processor, perform an operation for managing shared libraries loaded into the memory when launching executable programs downloaded to an insecure location on the system, the operation comprising:
      detecting that a downloaded file has been written to the insecure location on the system;
      determining that the downloaded file includes an executable component;
      generating a copy of the executable component in a protected repository on the system; and overwriting contents of the executable component in the downloaded file with at least instructions to launch the copy of the executable component from the protected repository.

10. The system of claim 9, wherein overwriting the contents of the executable component comprises writing, to the executable component, instructions for setting a current path to the protected repository, the current path identifying a location from which one or more commands are executed.

11. The system of claim 9, wherein generating the copy of the executable component in the protected repository comprises:
   creating a directory in the protected repository; and
   copying the downloaded file, including the executable component, from the insecure location to the directory in the protected repository.

12. The system of claim 9, wherein the protected repository comprises a hidden directory on the system and wherein permissions associated with the protected repository prevent users from writing data to the protected repository.

13. The system of claim 9, wherein the operation further comprises:
   identifying one or more files stored in the location that have not been accessed for a threshold amount of time; and
   deleting the identified files.

14. The system of claim 9, wherein the operation further comprises:
   deleting the downloaded file from the insecure location; and
   deleting, from the protected repository, the copy of the executable component referenced by the downloaded file.

15. A non-transitory computer-readable medium comprising instructions which, when executed by one or more processors, perform an operation for managing shared libraries loaded into memory when launching executable programs downloaded to an insecure location on a computing device, the operation comprising:
   detecting that a downloaded file has been written to the insecure location on the computing device;
   determining that the downloaded file includes an executable component;
   generating a copy of the executable component in a protected repository on the computing device; and
   overwriting contents of the executable component in the insecure location with at least instructions to launch the copy of the executable component from the protected repository.

16. The non-transitory computer-readable medium of claim 15, wherein overwriting the contents of the executable component comprises writing, to the executable component, instructions for setting a current path to the protected repository, the current path identifying a location from which commands are executed.

17. The non-transitory computer-readable medium of claim 15, wherein overwriting the contents of the executable component comprises writing, to the executable component, instructions for modifying an order in which the executable component searches the computing device for the shared libraries to load into the memory.

18. The non-transitory computer-readable medium of claim 15, wherein generating the copy of the executable component in the protected repository comprises:
   creating a directory in the protected repository; and
   copying the downloaded file, including the executable component, from the insecure location to the directory in the protected repository.

19. The non-transitory computer-readable medium of claim 15, wherein the operation further comprises:
   identifying one or more files stored in the location that have not been accessed for a threshold amount of time; and
   deleting the identified files.

20. The non-transitory computer-readable medium of claim 15, wherein the operation further comprises:
   deleting the downloaded file from the insecure location; and
   deleting, from the protected repository, the copy of the executable component referenced by the downloaded file.

* * * * *